United States Patent
Aeberhard et al.

(10) Patent No.: US 7,970,514 B2
(45) Date of Patent: Jun. 28, 2011

(54) VEHICLE ADAPTED FOR DISABLED PEOPLE

(75) Inventors: Hannes Aeberhard, Orpund (CH);
Christian Andres, Büren a.A (CH);
Bernhard Gerster, Meinisberg (CH);
Daniel Schütz, Nidau (CH); Linus Rohner, Biel (CH)

(73) Assignee: Bozzio AG, Biel (CH)

( * ) Notice: Subject to any disclaimer, the term of this patent is extended or adjusted under 35 U.S.C. 154(b) by 0 days.

(21) Appl. No.: 12/789,500

(22) Filed: May 28, 2010

(65) Prior Publication Data
US 2010/0235041 A1 Sep. 16, 2010

Related U.S. Application Data

(63) Continuation of application No. PCT/EP2007/063140, filed on Dec. 3, 2007.

(51) Int. Cl.
*B60K 26/00* (2006.01)
(52) U.S. Cl. ........... 701/41; 180/333; 180/334; 180/315
(58) Field of Classification Search .......... 180/333–334, 180/315; 701/41–44
See application file for complete search history.

(56) References Cited

U.S. PATENT DOCUMENTS

| | | | | |
|---|---|---|---|---|
| 2,274,069 A | * | 2/1942 | Johnson | 74/557 |
| 3,022,850 A | * | 2/1962 | Bidwell et al. | 180/333 |
| 4,476,954 A | * | 10/1984 | Johnson et al. | 180/333 |
| 4,722,416 A | * | 2/1988 | Ahnafield | 180/333 |
| 5,021,771 A | * | 6/1991 | Lachman | 345/164 |
| 5,335,743 A | * | 8/1994 | Gillbrand et al. | 180/178 |
| 5,531,402 A | * | 7/1996 | Dahl | 244/99.2 |
| 5,550,539 A | * | 8/1996 | Miki et al. | 341/20 |
| 5,652,603 A | * | 7/1997 | Abrams | 345/157 |
| 6,161,449 A | * | 12/2000 | Fujimori | 74/557 |
| 6,701,801 B1 | * | 3/2004 | Wilson et al. | 74/557 |
| 7,433,771 B2 | * | 10/2008 | Herges | 701/70 |

(Continued)

FOREIGN PATENT DOCUMENTS

DE 102004028938 A1 3/2005

(Continued)

OTHER PUBLICATIONS

International Search Report for PCT/EP2007/063140 dated Aug. 5, 2008.

*Primary Examiner* — Mark Hellner
*Assistant Examiner* — Ari M Diacou
(74) *Attorney, Agent, or Firm* — Pearne & Gordon LLP (57) ABSTRACT

A vehicle including a controller with a steering input module and a brake input module is disclosed. The steering input module (11) has a mechanical interface to which the exchangeable operating elements (12) for steering the vehicle can be attached. The brake input module (21) has a mechanical interface with touchless sensors (211a, b), to which the exchangeable operating elements (22) for braking can be attached. Per the steering input module (11) and/or brake input module (21), at least one main controller board (131a, b, 231a, b, 321, 332) is provided. For the steering input module, the main controller board sets the individual parameters with respect to the steering angle and straight-ahead position of the exchangeable operating elements (12) for steering the vehicle. For the brake input module, the main controller board sets the individual parameters with respect to the brake distance of the exchangeable operating elements (22) for braking. The invention further relates to a method for subsequently retrofitting a vehicle with the control system.

27 Claims, 4 Drawing Sheets

U.S. PATENT DOCUMENTS

| | | |
|---|---|---|
| 2002/0046895 A1 | 4/2002 | Kaneda et al. |
| 2003/0038468 A1* | 2/2003 | Chernoff et al. ............. 280/781 |
| 2004/0140145 A1 | 7/2004 | Chernoff et al. |
| 2005/0023071 A1* | 2/2005 | Ahnafield .................... 180/333 |
| 2005/0057031 A1* | 3/2005 | Ahnafield .................... 280/771 |
| 2005/0057087 A1* | 3/2005 | Ahnafield ...................... 303/20 |
| 2005/0274563 A1* | 12/2005 | Ahnafield .................... 180/336 |
| 2005/0275205 A1* | 12/2005 | Ahnafield .................... 280/771 |
| 2006/0191733 A1* | 8/2006 | Paquin ........................ 180/333 |

FOREIGN PATENT DOCUMENTS

| | | |
|---|---|---|
| EP | 1595766 A2 | 11/2005 |
| GB | 2314607 A | 1/1998 |
| WO | 2005120929 A1 | 12/2005 |

* cited by examiner

Fig. 5

VEHICLE ADAPTED FOR DISABLED PEOPLE

BACKGROUND OF THE INVENTION

1. Technical Field

The invention relates to a vehicle with a controller corresponding to the independent claim. Specifically, it relates to a vehicle suitable for disabled people that is provided with a steering and brake input module on which different exchangeable operating elements for steering and braking the vehicle according to the wish and need of the user can be attached. The invention also relates to a method for subsequently retrofitting a vehicle with a control system.

2. State of the Art

Many input devices for purely electric control systems are known in the state of the art.

In particular, control systems are known which give the driver of a vehicle feedback about the steering power or the wheel position. For this, so-called force feedback systems were developed to fulfill this task. As feedback value, it is possible to use either the steering power effectively generated at the steering gear or the effective wheel steering lock angle. The feedback can in particular occur electronically, mechanically or hydraulically. Force feedback, apart from being used in vehicles, is also used for simulators or computer games. The most important task of the force feedback systems for land-based motor vehicles is to inform the driver about the state of the road, the vehicle lateral acceleration and the road grip reserve of the wheels. In applications for vehicles for physically disabled people, a so-called joystick or sidestick is typically used for entering a control signal.

Such a system is known for example from EP1595766, wherein a vehicle is steered on the basis of actuating a joystick. The control signal is forwarded through a step-down gear to a potentiometer, which then steers an electric motor. This motor is connected through a gearing mechanism with the steering column. Mechanical elements enable the rotation movement to be converted into a linear movement. The linear movement is then mechanically conveyed over wiring harnesses to the joystick, so that the user receives a feedback about the movement. The disadvantage of this system is, however, that it cannot be adjusted to the user.

GB2314607 discloses a further steering system with a joystick. The joystick can be moved in the vehicle's transverse axis. The vehicle can be accelerated or slowed through a foot pedal and a control stick. An actuator affixed to the joystick can exert a reactive force onto the joystick. The disadvantage of this system is that the driver needs to steer the vehicle with his hands and also with his feet. Furthermore, the joystick can be actuated unintentionally, which has a negative impact on the driving safety.

WO2005120929 discloses another joystick. In order to execute a steering movement, the joystick can be actuated circularly in a guide slot. This joystick has the disadvantage that the user needs to move the entire arm, which causes fatigue symptoms to the driver especially on long journeys.

The handling of so-called four-way joysticks is furthermore very difficult to learn for the user. This is because the joystick must be pressed forwards to accelerate the vehicle and additionally the joystick needs to be moved to the right or to the left in a curve. This is a disadvantage, since it is easily possible due to uncontrolled movements to lose control over the vehicle with a joystick of this kind.

A further problem with input devices from the state of the art arises from the mechanical factors that often require a considerable overall size.

A further disadvantage of the known input aids is that the user is limited to the proposed control system, the integrated joystick, etc. For this reason, US20040140145 for instance proposes a common electronics assembly, to which the different control systems can be connected. This will admittedly afford modularity to the system. The user can thus select from a plurality of control systems the one that appears most comfortable for him and have it built into his vehicle. In this system, however, the entire control system unit is replaced. This is comparatively laborious. If the user then decides to choose another system, there is no simple possibility of switching from a joystick to a slide controller or a steering wheel. In certain circumstances, it may be necessary even to replace the entire seat. Furthermore, in this modular system, steering and braking can only be replaced in combination, which constitutes a further disadvantage. The user who can yet still steer but no longer brake (for example because of a disability in the legs) can only select the complete system, not just a module for the brakes. This increases the overall cost of the system and makes it more complicated and less attractive for disabled people.

REPRESENTATION OF THE INVENTION

Based on the state of the art, the invention has the aim of proposing a system that can be adapted more easily than the known control system to the needs of the user.

A further aim is to propose a system that can be subsequently fitted in a vehicle. This should apply also to one only of the primary functions of steering and braking.

It is another aim of the invention to provide a control system for a vehicle that, in the event of failure of security-critical components, guarantees in any case the primary function (steering, braking).

It is another aim of the invention to propose an input device that can be operated easily and safely with variable exertion of force.

These aims are achieved with a vehicle with an inventive steering according to the characteristics of the independent claim. Advantageous embodiments of the invention are indicated in the dependent claims.

According to the invention, these aims are achieved with a vehicle with a steering that is characterized by:

a steering input module having a mechanical interface to which different exchangeable operating elements for steering the vehicle can be attached and having at least one sensor in order to detect the movement of the operating element, wherein the steering input module is connected with at least one steering actuator for executing the steering wishes to the vehicle; and/or a brake input module comprising a mechanical interface having touchless sensors, to which different exchangeable operating elements for braking can be attached and having at least one brake actuator for executing the steering wishes to the vehicle; and wherein per steering input module and/or brake input module at least one main controller is provided in order to set the individual parameters with respect to the steering angle and straight-ahead position of a specific exchangeable operating element for steering the vehicle and/or in order to set the individual parameters with respect to the brake distance of a specific exchangeable operating element for braking.

The invention further relates to a method for subsequently retrofitting a vehicle with the modular control system according to the invention.

The invention further relates to a method for configuring an inventive vehicle, wherein the main controller or controllers is connected and configured through an interface with an external computer in order to set the individual parameters with respect to the steering angle and straight-ahead position of a specific exchangeable operating element for steering the vehicle and/or in order to set the individual parameters with respect to the brake distance of a specific exchangeable operating element for braking.

The invention also relates to a computer program product with a software code that is capable of running on a computer in order to execute the inventive method for configuring an inventive vehicle.

It is an advantage of the proposed system that it is possible to attach different operating elements on one and the same mechanical interface both in relation to the steering input system as well as to the brake input system, without having to modify the security-critical electric and electronic system. The system allows driving parameters dependent on the user and on the operating element, such as left and right steering stop, straight-ahead position and force feedback, to be set.

The inventive control system is additionally characterized in that only an electric or electronic but no mechanical connection is provided between the steering and brake input module and the steering and brake actuator, including the converter module lying there between. The control signals for steering and braking therefore need to be converted electronically before execution takes place in the actuators and the vehicle.

The overall control system thus advantageously has a so-called hot-spare or failover/standby mechanism, so that at least two systems/stands for steering and at least two systems/strands for braking are always active simultaneously. If one system fails, the other is ready to maintain the basic function. The overall control system detects over 99% of all errors and in this case drives the vehicle in a safe state. Safe state, in relation to the primary functions of steering and braking, means preserving the functions. The overall control system includes an architecture that communicates to the overall system, through a common communication bus, all errors of the subsystems. The overall control system includes an architecture that may have a discrete cabling from the exchangeable operating elements to the actuators in the subsystems. This also ensures modularity.

Further advantageous embodiments are indicated in the sub-claims.

BRIEF DESCRIPTION OF THE FIGURES

The example will be described in more detail on the basis of the attached figures, which show.

EXAMPLE(S) OF EMBODIMENTS OF THE INVENTION

Figure 1:
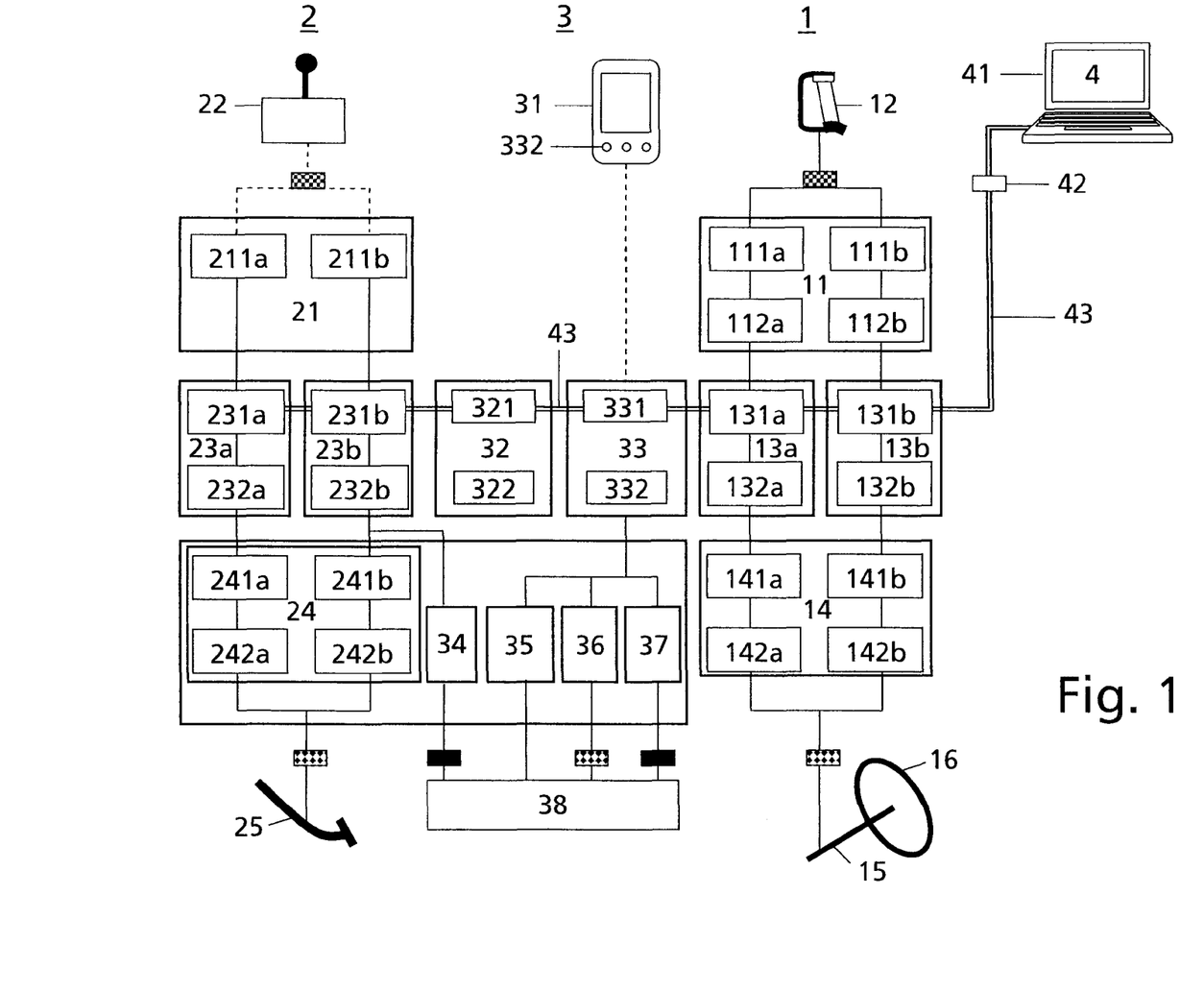
FIG. 1 an overall view of the inventive system.
Figure 2A:
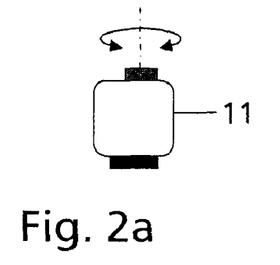
FIG. 2a-e a steering input module (FIG. 2a) and various operating elements of a steering system (FIG. 2b-e) that can be used by the users.
Figure 2B:
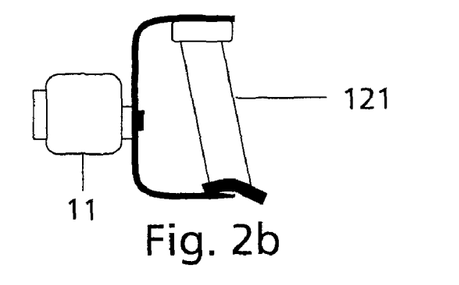
Figure 2C:
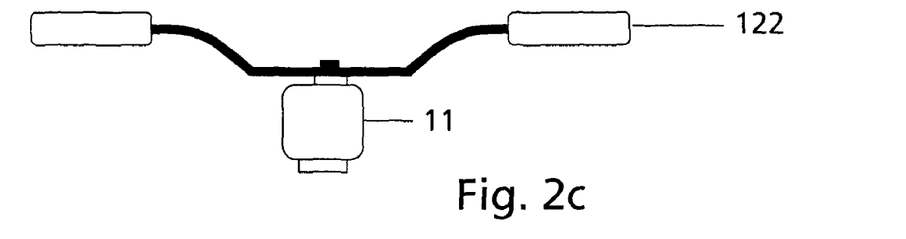
Figure 2D:
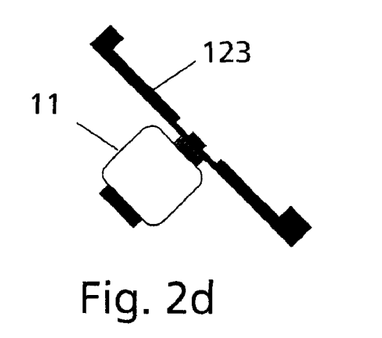
Figure 2E:
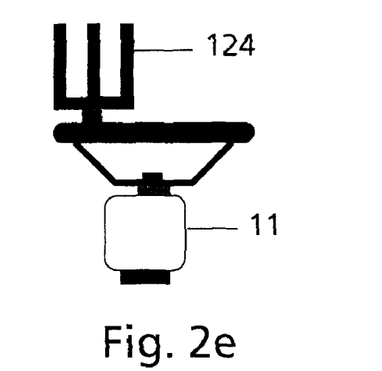

The inventive control system gives people who cannot operate a road vehicle by means of a steering wheel and pedals the possibility of steering the inventive vehicle through an exchangeable user interface. The inventive system has a modular structure and includes different modules that are explained individually. The starting point is a motorcar normally provided with steering wheel and steering column and a gas and brake pedal. In the frame of the invention, a steering column and a gas and brake pedal are not absolutely necessary. The individual modules that can be integrated subsequently and individually into the vehicle or the motorcar are described in more detail in relation to FIG. 1.

Steering System 1

A steering input module 11 is provided with a mechanical interface to which different exchangeable operating elements 12 for steering the vehicle can be attached. As can be seen in FIGS. 2a-e, in the frame of the invention, the exchangeable operating elements 12 for steering the vehicle can conceivably be one or several joysticks 121 (FIG. 2b), a finger joystick, a motorbike or bicycle handlebar 122 (FIG. 2c), a footplate 123 (FIG. 2d), a mini steering wheel 124 (FIG. 2e) or a knee lever steering. In case of a joystick 121, the rotation axis can lie in the middle of the joystick resp. through the wrist center in the extension of the arm (see FIG. 2b). This serves to make handling easier. A finger joystick has a rotation axis below the hand rest. Further operating elements 12 are in principle conceivable. In a further embodiment, two joysticks 121 are provided, wherein a first joystick 121 is available with the steering input module 11 through the mentioned mechanical interface and the other is connected with a first joystick through an arrangement of levers 125 (see FIG. 5). The path of each individual operating element 12 to or for steering the vehicle is in each case different. A mini steering wheel 124 can be turned in several turns per direction, the joystick only a couple of degrees, etc. It is in principle conceivable that the operating elements 12 can be manipulated with the right, the left or with both arms/hands.

The movement of the exchangeable operating element 12 is detected with at least one sensor 111$a,b$ that forwards the signal to a corresponding actuator 112$a$ b. The sensor 11$a$, $b$ and the actuator 112$a$, $b$ are provided in the steering input module 11. The steering system 1 advantageously has both a redundant sensor technology for the relative incremental position detection as well as a redundant sensor technology for the absolute position detection.

When the driver operates the vehicle, a force is exerted on the operating elements 12 and these are deflected from a reference position. Between the steering input module 11 and an output module 14 with a steering actuator 142$a,b$, there is a converter module 13$a,b$ which comprises a main controller board 131$a,b$ and a converter 132$a,b$. The deflection of the operating elements 12 away from the reference position is forwarded to the main controller board 131$a,b$ and the latter generates from it a torque for (steering) actuators 142$a,b$ on the steering column 15. To control the torque, the torque is detected through additional sensors 141$a,b$ and compared with the parameter.

The steering input module 11 acts on an existing steering column 15 and is integrated directly behind the steering wheel 16. This is particularly advantageous if the vehicle is to continue being used with the existing pedals and the steering wheel. It is however not absolutely necessary for the invention. Rather, the actuators 142$a,b$ of the steering system 1 can act directly on the steering mechanism.

The sensor technology and the actuating elements responsible for steering are executed in redundant fashion for safety reasons. In the embodiment given by way of example, these are executed in double strand (strand with the elements 111$a$, 112$a$, 131$a$, 141$a$, 142 and strand with the elements 111$b$, 112*b*, 131*b*, 141*b*, 142*b*), the number of the strands will however depend on the individual case. Advantageously, two sensors 111*a* and two sensors 111*b* will be provided per strand. In case of error, at least one steering motor/steering actuator 142*a,b* is therefore always capable of generating a steering torque corresponding to the driver's steering wish. The defective strand must therefore be capable of detecting the error and switching itself off. The converter modules 13*a,b* are therefore provided with self-diagnosis means. The converter module or modules 13*a,b* are located in the inside of the vehicle close to the steering input module 11.

A force feedback system transmits the force of the wheels back to the exchangeable operating element 12. The actuating elements responsible for the feedback are not executed in redundant fashion. It his however necessary to provide for its reaction in case of failure, i.e. that it switches off. The feedback takes place in the steering input module 11 through a brake in the form of a block and actively by means of a motor. Brake and motor are controlled each by one channel, based on the measurement values required for the steering function. A torque is indicated to the motor proportionally to the deflection of the operating elements 12 from the reference position. In the steering input module 11, the brake functions as block when the maximum deflection value of effective position to reference position is reached. The steering system 1 additionally has an oversteer feedback by means of alternating haptic signals.

In order to use the limited path of the operating elements 12 in optimal fashion, the lever transmission from the operating element 12 to the steering column 15 is speed-dependent. To this effect, two or several additional speed sensors are integrated in the vehicle and are capable of measuring the vehicle speed in redundant fashion. The vehicle's speed can be recorded with rotational speed sensors on a drive shaft.

Brake System 2

Figure 3A:
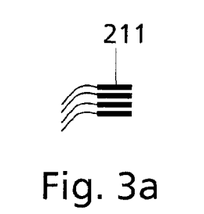
FIG. 3a-c a brake input module with touchless sensors (FIG. 3a), a locking drawer (FIG. 3b) and a rocker arm (FIG. 3c)
Figure 3B:
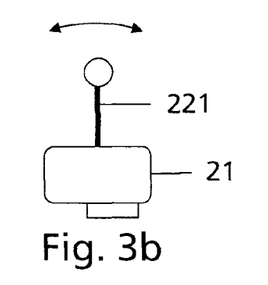
Figure 3C:
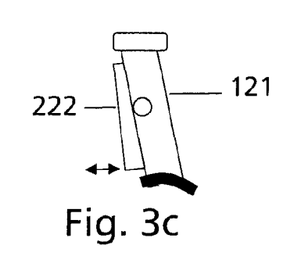

The brake input module 21 comprises a mechanical interface with one or several touchless sensors 211*a,b* to which the exchangeable operating elements 22 for braking and accelerating can be attached. As exchangeable operating elements 22 for braking and accelerating, it is possible to provide a locking drawer 221 (FIG. 3*b*) or a tilt lever/rocker arm 222 (FIG. 3*c*) or a thumb button. Other suitable operating elements 22 are conceivable within the frame of the invention. The operating element 22 can have one or several pressure points for accelerator/brake, which allows a fluid transition and a more agreeable operation for the user.

The brake input module 21 can act on an existing brake pedal 25 through at least one brake actuator 242*a,b* of an output module 24. In the brake input module 21, the user's braking wish is detected. By exerting a force, a brake pressure is generated through the brake actuators 242*a,b*, of the output module 24 that corresponds to the braking wish. To control the brake pressure, the pressure in the hydraulic conduits of the braking installation is detected by means of additional sensors 241*a,b*. It is of course possible for the actuator 242*a,b* to exert a force not on the brake pedal but in another manner for example directly on the brake disk, etc.

Between the brake input module 21 with the mechanical interface and the output module 24 with the sensors 241*a,b* and brake actuators 242*a,b*, there is a converter module 23*a,b* that contains a main controller board 231*a,b* and a converter 232*a,b*. The converter module 23*a,b* performs with the converter 232*a,b* a torque control of an actuator 242*a,b*.

The sensor technology and the actuating elements responsible for braking are executed in redundant fashion for safety reasons. In the embodiment given by way of example, these are executed in double strand (strand with the elements 211*a*, 231*a*, 232*a*, 241*a*, 242*a* and strand with the elements 211*b*, 231*b*, 232*b*, 241*b*, 242*b*), the number of the strands will however depend on the individual case. Advantageously, two sensors 211*a* and two sensors 211*b* will be provided per strand. The defective strand must in case of failure be capable of detecting the error and switching itself off. In case of error, at least one brake actuator 242*a,b* is therefore always capable of generating a braking torque corresponding to the driver's braking wish. The converter module or modules 23*a,b* are located in the inside of the vehicle close to the brake input module 21.

An exception is constituted by the pressure sensors in the hydraulic conduits of the braking installation. These are executed only in single fashion. In case of defective brake pressure sensors 241*a,b*, instead of controlling the brake pressure, one switches to controlling the torques of the brake motor and thus the force on the brake pedal 25.

The brake pressure control can also be speed-dependent in order to improve brake control at low vehicle speeds. To this effect, the speed sensors previously mentioned in connection with the steering module are integrated in the vehicle and are capable of measuring the vehicle's speed in redundant fashion.

The brake system 2 will be provided with a force feedback that enables the user to feel the braking force.

The steering and brake input modules 11, 21 can be integrated in different mechanical modules. In one particular embodiment, both modules—steering and brake input modules 11, 21—are located in a single module. It is conceivable in this case for the mentioned tilt lever/rocker arm 222 that is used for braking/accelerating to be integrated in a user-friendly manner in a joystick 121. The touchless sensors 211*a,b* detect the position of the tilt lever and forward this to the mentioned brake actuators 241*a,b*. In the case of the above-mentioned embodiment with two joysticks 221, one of the joysticks 221 is connected mechanically with the module 11 and the other is provided with the tilt lever 222. The second joystick is merely connected with the first joystick through the arrangement of levers 125 (see FIG. 5). This second joystick may however comprise a switch for performing the secondary functions.

Module 3 for Secondary Functions 38

Figure 4:
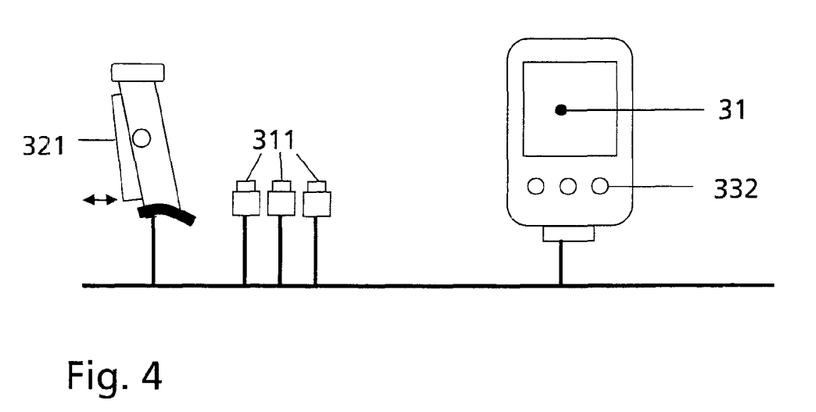
FIG. 4 a view of the secondary module with touch panels or keys.

The module 3 for secondary functions 38 includes functions such as light, windscreen wipers, indicators, gas 34, hand brake 35, gearshift 36, automatic transmission, ignition, starter motor, other inlets/outlets 37, etc. The module 3 for secondary functions 38 can consist of a touch screen 31. For people that cannot operate the touch screen 31, there is an interface through one or several push-buttons 311 (FIG. 4). Either three push-buttons 311 or the mentioned tilt lever/rocker arm 312 can be connected there. As mentioned further above, the tilt lever 312 can be integrated in a second joystick 221 that is connected through an arrangement of levers 125 with the first joystick 221. With the aid of the push-buttons 311 or 312 it is possible to access all functions on the touch screen, such as scroll up, scroll down, select functions. The display is located within the driver's field of vision. Other kinds of input for the secondary functions are conceivable, such as for example rocker, switch that can be positioned freely, etc.

The module 3 for the secondary functions 38 includes the alarm module 33. The alarm module 33 consists of a main controller board 331 and a display 332. The display 332 can be integrated within the touch panel and produce optical and/or acoustic signals (see FIG. 1 or 4). The display indicates every failure in detail with an error description. In case of self-failure, this leads to a self-error message. The display exhibits a graphical representation of the navigation and of the operation of the secondary functions.

Energy Module 32

The energy module 32 comprises a main controller board 321 and an additional battery 322. The energy supply is based on the vehicle's on-board network. When the motor is running, the alternator ensures the supply of the vehicle and of the steering through said modules. In case of failure of the vehicle on-board network, the energy supply is guaranteed through the additional battery 322, a so-called backup battery. This can happen until the vehicle stops. In order to design the energy supply in a fault-tolerant fashion, it is separated into two systems. The energy module 32 monitors the primary energy (vehicle on-board network) and the secondary energy (backup battery 322). A diode is provided between the vehicle network and the backup network. It prevents the current flow from the backup network to the vehicle network that could cause the backup battery to discharge. A fuse in the connection between the vehicle on-board network and the backup network prevents short-circuiting in the backup network from having a negative impact on the vehicle on-board network. The state of charge of the backup battery 322 is determined at each system start by the energy module 32 in order to ensure that the backup battery 322 can be used if necessary. This can be achieved for example by means of a pulse test. The backup battery is located in the inside of the vehicle close to the steering input module 11.

Main Controller Boards 131a,b, 231a,b, 321, 331

The main controller boards 131a,b, 231a,b, 321, 331 are connected to one another through the common bus 43 to provide a vertical information exchange. The overall control system comprises an architecture that communicates to the overall system, through a communication bus 43, all errors of the subsystems (steering and brake system 1, 2, module 3 for secondary functions 38 incl. energy module 32 and alarm module 33).

All mentioned main controller boards 131a,b, 231a,b, 321, 331 can be used in identical manner in the different modules. The main controller boards consist of a certified main controller, a watchdog controller for monitoring the main controller, an EEPROM, inputs for an incremental decoder and an undervoltage disconnection test. These main controller boards 131a,b, 231a,b, 321, 331 can be programmed freely and are provided with security-enabled interfaces.

In case of error of a safety-critical primary function such as braking or steering, the main controller boards 131a,b, 231a,b, 321, 331 will shift the vehicle to a safe condition, with all errors being detected with a greater than 99% probability. As statistically relevant errors of a motor one can have winding short-circuit, coil short-circuit or errors in the Hall sensor technology etc. These errors regarding the state of the motor are detected by the main controller boards 131a,b, 231a,b, 321, 331 in real time on the basis of the motor model.

The software of the main controller boards 131a,b, 231a,b, 321, 331 consists of a diagnosis software on the main controller, a function software and a watchdog software on the watchdog controller. The diagnosis software, which is provided identically on each main controller board 131a,b, 231a,b, 321, 331, is responsible for the micro controller diagnosis. The function software has function-specific characteristics and parameters for steering, braking, energy management and information management. The watchdog software is also provided identically on each watchdog controller and is thus modular. The used software detects automatically the brake/steering system configuration and the associated parameters.

The overall control system includes an architecture that may have a discrete cabling from the exchangeable operating elements 12, 22 to the subsystems. The cabling of the brake system and of the steering system can be separated, it can be executed as brake-only strand or steering-only strand or as a common brake and steering strand. The inventive control system thus continues to remain completely modular. The overall control system resp. the main controller boards 131a,b, 231a,b, 321, 331 detect the cabling strand type.

The inventive control system is thus characterized in that between the steering and brake input module 11, 21 and the steering and brake actuator 142a,b, 242a,b (including the converter modules 13a,b, 23a,b between them) there is only an electric or electronic connection but no mechanical connection. It is thus a drive-by-wire system. The control signals for steering and braking therefore need to be converted electronically before execution takes place in the actuators.

External Configuration

Since different operating elements can be provided, the present invention includes at least one external PC 41 with a service software 4. The latter makes it possible to set the individual parameters with respect to the steering angle and straight-ahead position of a certain exchangeable operating element for steering the vehicle, which the user wishes to use, and in order to set the individual parameters with respect to the brake distance of a certain exchangeable operating element for braking, which the user also wishes to use. In order to configure the main controller boards of the converter module 13, 23 as well as of the alarm and energy modules 32,33, they can be connected over a service connector 42 and the communication bus 43 with an external computer or PC 41. The personal computer 41 runs a service manager suitable for the configuration.

The invention further relates to a method for configuring an inventive vehicle, wherein the main controller or controllers 131a,b, 231a,b, 321, 331 is connected with the external computer 41 and configured in order to set the individual parameters with respect to the steering angle and straight-ahead position of a specific exchangeable operating element 12 for steering the vehicle and/or in order to set the individual parameters with respect to the brake distance of a specific exchangeable operating element 22 for braking. The setting of the force feedback force is possible.

The invention also relates to a computer program product with a software code that is capable of running on a computer 41 in order to execute the inventive method for configuration.

Figure 5:
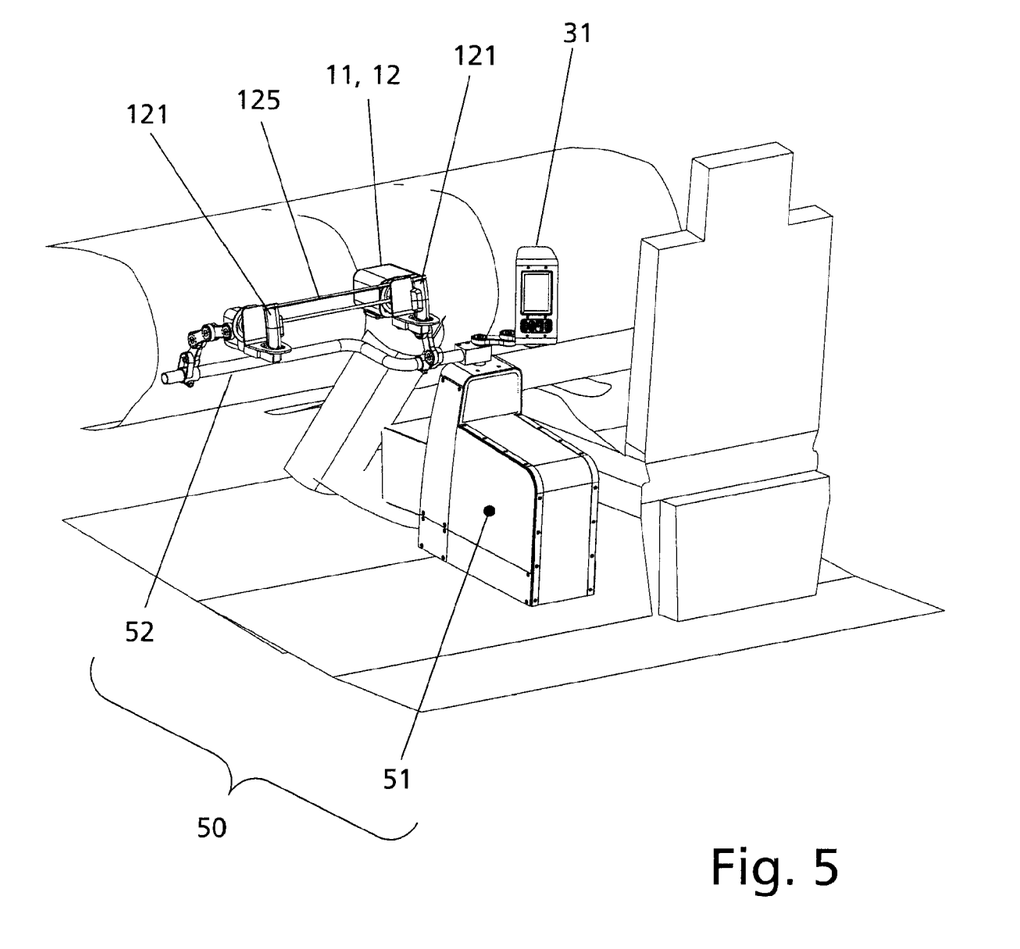
FIG. 5 an overall view of an inventive controller in a vehicle.

FIG. 5 shows an overall view of an inventive control in a vehicle with a module carrier 50. The module carrier 50 consists of an assembly carrier (rack) and at least a swivel arm 52. The rack 51 ensures a common positioning as well as a packaging of all electronic modules of the overall system and a central mechanical fastening to the vehicle. The swivel arm 52, which serves as carrier element for attaching the input modules 11, 21 as well as the exchangeable operating units 12, 22, can be adjusted individually to the driver's needs. The swivel arm 52 can be removed through a simple manipulation of the driver so that the vehicle can be driven with or without the inventive overall control system. The swivel arm 52 automatically switches on the overall control system when it is in a driver position.

It is an advantage of the proposed system that it is possible to attach different operating elements on one and the same mechanical interface both in relation to the steering input system as well as to the brake input system, without having to modify the security-critical electric/electronic system. The user can thus select the operating element that is the most comfortable or easy to operate for him and the electronics can then be configured over the service software. The system allows driving parameters dependent on the user and on the operating element, such as left and right steering stop, straight-ahead position and force feedback, to be set.

The proposed overall control system and the mentioned modules serve to be subsequently retrofitted in a motorcar. Existing steering installations (steering column, steering wheel) and pedals (gas, brake, clutch, indicators etc.) can remain so that driving with the existing steering wheel and the pedals remains possible. It is further possible within the frame of the invention that only the steering system 1 or only the brake system 2 are used and built into the vehicle. Disabled people who can still steer but no longer brake (or vice versa) can thus use only one module (steering system 1 or brake system 2) and additionally continue using an existing brake pedal 25 or an existing steering wheel 16. Since the inventive system has a modular structure, it offers the possibility of being completed and extended in future development steps with further modules, for example in the case of a continually progressing disability with a steering or brake system 1, 2 in addition to the existing system, etc.

Disabled and not disabled people can thus use the car side by side without transformations being necessary. The steering and the braking as well as the switches for operating the secondary elements are integrated in the vehicle in a manner that allows the driver to use them in optimal fashion. The proposed solution with the swivel arm 52 affords an easy way of making this possible.

REFERENCE NUMBERS

1 Steering system
11 Steering input module
111a,b Sensor
112a,b Actuator
12 Exchangeable operating element
121 Joystick
122 Motorbike handlebar
123 Footplate
124 Mini steering wheel
125 Arrangement of levers
13a,b Converter module
131a,b Main controller board
132a,b Converter
14 Output module
141a,b Sensor
142a,b Actuator
15 Steering column
16 Steering wheel
2 Braking system
21 Steering input module
211a,b Touchless sensors
22 Exchangeable operating element
221 Locking drawer
222 Rocker arm
23a,b Converter module
231a,b Main controller board
232a,b Converter
24 Output module
241a,b Sensor
242a,b Actuator
25 Brake pedal
3 Module for secondary functions
31 Touch panel
311 Push-button
312 Tilt lever/rocker arm
32 Energy module
321 Main controller board
322 Additional battery
33 Alarm module
331 Main controller board
332 Display
34 Gas
35 Hand brake
36 Gearshift
37 Other inlets/outlets
38 Secondary functions
4 Service software
41 External computer
42 Service connector
43 CAN bus, communication bus
50 Module carrier
51 Assembly carrier (rack)
52 Swivel arm

What is claimed is:

1. A control system for a vehicle, the control system comprising:
   a steering input module having a mechanical interface to which different exchangeable steering operating elements can be attached and having at least one sensor in order to detect movement of at least one of the steering operating elements, at least one of the steering operating elements is separate from an existing steering wheel, wherein the steering input module is connected with at least one steering actuator for executing steering instructions to the vehicle;
   a brake input module comprising a mechanical interface having touchless sensors, to which different exchangeable braking operating elements can be attached and having at least one brake actuator for executing braking instructions to the vehicle, at least one of the braking operating elements is separate from an existing brake pedal; and
   wherein per the steering input module and the brake input module at least one main controller board is provided (a) in order to set individual parameters with respect to steering angle and straight-ahead position of a specific exchangeable steering operating element and (b) in order to set individual parameters with respect to brake distance of a specific exchangeable braking operating element.

2. The control system according to claim 1, wherein the exchangeable steering operating element is one or several joysticks, a motorbike handlebar, a footplate, a mini steering wheel or a knee lever steering.

3. The control system according to claim 1, wherein the exchangeable steering operating element is a joystick, and a rotation axis lies in the middle of the joystick.

4. The control system according to claim 1, wherein the exchangeable steering and braking operating elements are a first joystick and a second joystick that are connected through an arrangement of levers, wherein the first joystick is connected with the steering input module.

5. The control system according to claim 1, wherein the braking operating elements for is a gas/brake locking drawer or a tilt lever/rocker arm.

6. The control system according to claim 1, wherein the steering input module and the brake input module are provided in a single module.

7. The control system according to claim 1, comprising a module for secondary functions.

8. The control system according to claim 7, wherein the module for secondary functions comprises a touch screen or at least one push-button.

9. The control system according to claim 7, wherein the module for secondary functions is connected with at least one main controller board.

10. The control system according to claim 1, comprising a force feedback system that transmits force of the vehicle's wheels back to the steering operating element, and the force can be adjusted in the at least one main controller board.

11. The control system according to claim 1, wherein the at least one steering actuator acts on an existing steering column in the vehicle and the at least one brake actuator acts on the existing brake pedal in the vehicle.

12. The control system according to claim 1, comprising at least one converter module with the at least one main controller board and a converter, wherein the at least one converter module is located between the steering input module and the at least one steering actuator or between the brake input module and the at least one brake actuator.

13. The control system according to claim 1, comprising hot-spare/failover converter modules with each a main controller board and a converter, wherein the hot-spare/failover convert modules are located between the steering input module and the at least one steering actuators and between the brake input module and the at least one brake actuator.

14. The control system according to claim 1, comprising hot-spare/failover converter modules with each a main controller board and a converter, wherein the hot-space/failover convert modules are located between the steering input module and the at least one steering actuators and between the brake input module and the at least one brake actuator and in case of an error the main controller boards are capable of detecting the error and switching off the faulty strand, so that at least one steering and brake actuator always remains operational.

15. The control system according to claim 1, wherein lever transmission from the steering operating element to a steering column or brake pressure control is speed-dependent.

16. The control system according to claim 1, wherein between the steering and brake input module and the at least one steering actuator and the at least one brake actuator only an electric or electronic connection is provided.

17. The control system according to claim 1, comprising an energy module with an energy module main controller board for monitoring energy supply of the system.

18. The control system according to claim 1, wherein energy supply of the system is ensured through a vehicle on-board network, wherein, in case of failure of the on-board network, the energy supply is guaranteed through an additional battery.

19. The control system according to claim 1, comprising several main controller boards that are connected to one another over a communication bus.

20. The control system according to claim 1, wherein the at least one main controller board or boards can be connected with an external computer for the purpose of configuration.

21. The control system according to claim 1, comprising a module carrier on which the modules are attached.

22. The control system according to claim 1, comprising a swivel arm to serve as a carrier element for attaching and supporting the brake and steering input modules, said swivel arm being removable through a manipulation and automatically switching on the control system when it is in a driver position.

23. The control system according to claim 1, wherein the steering input or brake input module can be subsequently retrofitted to the vehicle.

24. The control system according to claim 1, wherein operating the vehicle through the existing steering wheel, an existing gas pedal, and the existing brake pedals, in addition to the exchangeable steering and braking operating elements, remains possible.

25. Method for fitting a vehicle body with the control system according to claim 1, wherein the steering input module with the steering operating element, the main controller board and steering actuator or the brake input module with braking operating element, the main controller board and brake actuator can be subsequently retrofitted to the vehicle body.

26. Method for configuring a vehicle with the control system according to claim 1, wherein the at least one main controller board can be connected through an interface with an external computer in order to set parameters with respect to the steering angle and straight-ahead position of at least one of the exchangeable steering operating elements or in order to set parameters with respect to the brake distance of at least one of the exchangeable steering operating elements.

27. Computer readable medium containing a software code that is capable of running on a computer in order to execute the method according to claim 25, in order to set in the at least one main controller board parameters with respect to the steering angle and straight-ahead position of at least one of the exchangeable steering operating elements or in order to set parameters with respect to the brake distance of at least one of the exchangeable braking operating elements.

* * * * *